(12) United States Patent
Hsiung

(10) Patent No.: US 10,087,339 B2
(45) Date of Patent: Oct. 2, 2018

(54) STRUCTURAL COLORANTS THAT DO NOT EXHIBIT IRIDESCENCE

(71) Applicant: THE SHERWIN-WILLIAMS COMPANY, Cleveland, OH (US)

(72) Inventor: Bor-Kai Hsiung, Akron, OH (US)

(73) Assignee: The Sherwin-Williams Company, Cleveland, OH (US)

( * ) Notice: Subject to any disclaimer, the term of this patent is extended or adjusted under 35 U.S.C. 154(b) by 0 days.

(21) Appl. No.: 15/632,421

(22) Filed: Jun. 26, 2017

(65) Prior Publication Data

US 2017/0369730 A1    Dec. 28, 2017

Related U.S. Application Data

(60) Provisional application No. 62/354,863, filed on Jun. 27, 2016.

(51) Int. Cl.
| | |
|---|---|
| *B32B 27/08* | (2006.01) |
| *B82Y 40/00* | (2011.01) |
| *C09D 5/00* | (2006.01) |
| *C09D 127/18* | (2006.01) |
| *C09D 133/14* | (2006.01) |
| *C09D 133/10* | (2006.01) |
| *C09D 125/06* | (2006.01) |
| *C09D 5/33* | (2006.01) |
| *C09D 125/18* | (2006.01) |
| *C09D 7/61* | (2018.01) |

(52) U.S. Cl.
CPC ............ *C09D 133/10* (2013.01); *B32B 27/08* (2013.01); *C09D 5/004* (2013.01); *C09D 7/61* (2018.01); *C09D 125/06* (2013.01); *C09D 125/18* (2013.01); *C09D 127/18* (2013.01)

(58) Field of Classification Search
CPC ............................... B32B 27/08; B82Y 40/00
See application file for complete search history.

(56) References Cited

U.S. PATENT DOCUMENTS

2015/0309231 A1* 10/2015 Banerjee ................ G02B 5/286
359/584
2015/0362669 A1* 12/2015 Aizenberg .............. G01L 1/247
385/13

* cited by examiner

*Primary Examiner* — Vu A Nguyen
(74) *Attorney, Agent, or Firm* — James C. Scott

(57) ABSTRACT

According to some embodiments, a structural colorant is provided including a semi-continuous structure formed by multiple layers of a first polymer. In some embodiments, air gaps are interspersed between the layers of the first polymer. In some embodiments, a second polymer is interspersed between the layers of the first polymer. In some embodiments, the semi-continuous structure has a center and at least two planes of symmetry through its center.

14 Claims, 10 Drawing Sheets

Prior Art

Prior Art

STRUCTURAL COLORANTS THAT DO NOT EXHIBIT IRIDESCENCE

This application claims the benefit of U.S. provisional application No. 62/354,863 filed on Jun. 27, 2016, the entirety of which is hereby incorporated by reference.

FIELD

Materials and methods for providing structural colorants that are suitable for use in paints and coatings are described.

BACKGROUND

Paints typically provide an aesthetic as well as a protective function. Providing color to paints is an important function which is critical to having a paint that is efficacious in its aesthetic functionality because users not only wish to have a paint coating that protects their surfaces, but a paint coating which is aesthetically appealing.

Colors are commonly imparted to paints through the use of pigments. Pigments are materials that produce color by the reflection or absorption of specific wavelengths of light. In paints, pigments are often inorganic or organic materials which are ground into a fine powder and then dispersed into the paint solution to impart a color onto the paint product. Organic pigments are based on carbon chains and carbon rings. However, they can also contain metallic (inorganic) elements that help stabilize the properties of the organic component. Exemplary organic pigments include: quinacridones, phthalocyanines, perylenes, pyrroles, arylamides, and others. Inorganic pigments, chemical compounds not based on carbon, are usually metals, metal oxides, or mixed metal oxides. Commonly used inorganic paint pigments include metallic pigments which are typically made out of aluminum, but can also be made from copper, bronze, nickel or stainless steel; metal oxides such as iron oxide, manganese oxide, and cobalt oxide; and interference pigments such as metal oxide mica which interact with light to produce an optical effect on the perceived color.

Organic pigments have many benefits, including that they can be made to be very consistent, on a commercial scale, and at a relatively low cost. However, organic pigments may not provide the strongest level of durability because the chemical structure of the pigments may become degraded over time and exposure to the elements, such as rain, air, and sunlight.

Inorganic pigments may also be used to impart color into a paint system. Inorganic pigments have the advantages of being able to withstand the impact of sunlight and chemical exposure in a better way than organic pigments. They also have high opacity and thus provide a relatively high level of hide, and are relatively inexpensive compared to organic pigments. However, inorganic pigments have a low tint strength and thus a large number of pigment particles are required to produce the desired color in a paint composition. In addition, the color from many inorganic pigments is comparatively less vivid and may be perceived by consumers as being less bright or muddier than organic pigments and while many of these limitations can be overcome, the inorganic pigments which provide such effects are cost-prohibitive for large-scale commercial use.

Structurally-produced colors may be provided which overcome many of the hurdles of typical organic pigments because bright, vibrant, durable colors may be delivered. However, structurally-derived colors are limited in their usefulness due to iridescence which often occurs in such pigments. In U.S. Pat. No. 8,323,391 to Banerjee et al., a particular omnidirectional structural pigment for automotive paint is described by providing a particular configuration to a multilayer structure. However, such a structure may not be well suited for use in a paint solution because such color is provided by a film formed on a surface.

An alternative means of delivering structurally-based color is described in Khudiyev, T., Dogan, T. & Bayindir, M. Biomimicry of multifunctional nanostructures in the neck feathers of mallard (*Anas platyrhynchos* L) drakes. *Sci. Rep.* 4, 4718 (2014) works by providing an ordered structure of individualized elements that are bundled together. However, using such a methodology is not viable to provide structural colorants for paints due to the color being provided by fibers and the resultant iridescence from this structure.

Thus, there is a need for a method and material that may be used as a structural colorant for use within a paint system that does not exhibit iridescence.

SUMMARY

According to some embodiments, a structural colorant is provided. The structural colorant comprises a semi-continuous structure formed by multiple layers of a first polymer and air gaps interspersed between the layers of the first polymer, where the semi-continuous structure has a center and at least two planes of symmetry through its center.

According to some other embodiments, a structural colorant comprises a semi-continuous structure formed by multiple layers of a first polymer and multiple layers of a second polymer interspersed between the layers of the first polymer, where the semi-continuous structure has a center and at least two planes of symmetry through the center.

DETAILED DESCRIPTION

Definitions

"Colorant" as used herein refers to a material that imparts color to a paint product. Colorants may be a combination of a liquid and a pigment that may absorb light at certain wavelengths to impart color, or colorants may reflect light at certain wavelengths to provide color to the viewer. Exemplary colorants for paints and coatings are: ColorCast Ecotoner® Colorants, NovoColor™ Colorants, Aurasperse Colorants®, Gennex® Colorants, Colortrend® Colorants, and the like.

"Iridescence" as used herein refers to an optical phenomenon of an object in which color changes with the angle of observation and the angle of illumination. In some embodiments, iridescence is caused by multiple reflections from two or more semi-transparent surfaces in which phase shift and interference of the reflections modulates the incidental light (by amplifying or attenuating some frequencies more than others). The thickness of the layers of the material determines the interference pattern. In other embodiments, Iridescence can also be created by diffraction. In many paint systems, such as those for architectural or industrial purposes, iridescence is not a desired effect because consumers typically want to have a paint color that appears to be the same regardless of the angle at which the consumer looks at the paint.

"Pigment" as used herein refers to a material that produces the color of reflected or transmitted light as the result of wavelength-specific absorption as opposed to fluorescence, phosphorescence, and other forms of luminescence, in which a material emits light. Many materials selectively absorb certain wavelengths of light.

"Structural Colorant" as used herein refers to a material that facilitates the production of color by microscopically structured objects fine enough to interfere with and/or diffract visible light. In some embodiments a structural colorant may be used in combination with a pigment.

The present disclosure is directed to compositions and methods for making a structural colorant which is substantially free of any perceivable iridescence or color changing effects. While several specific embodiments are discussed herein, it is understood that the present disclosure is to be considered only as an exemplification of the principles of the invention and is not intended to limit the disclosure to the embodiments illustrated.

Figure 1:
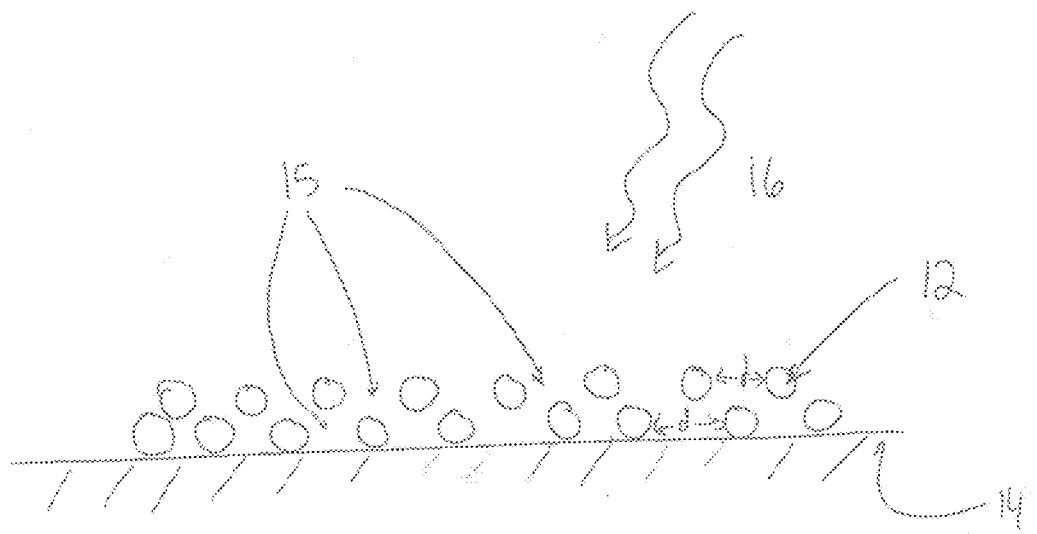
FIG. 1 shows cross-sectional view of an exemplary structural colorant according to the prior art.
Figure 1:

Many structural colorants of the prior art are made by applying a structure to a surface wherein the structure provides the requisite interaction with light to produce colors. FIG. 1 shows a typical prior art structural colorant 10 wherein a plurality of polymeric particles 12 are disposed upon a surface 14 at some fixed spacing distance d relative to each other in order to provide diffraction of incident light waves 16. Providing this sort of structure is unsuitable for use in a paint product because of the iridescence which will occur as the structural colorant 10 moves about due to the relative change in the fixed distance due to the dependence on d with the angle of the incident light 16—especially at a large scale.

Such structural colorant 10 particles may provide color based on air gaps 15 between the polymeric particles 12. Because of the presence of such exposed air gaps, though, the concept of using a plurality of individualized polymeric particles 12 (such as strands of polymers) is incompatible for use of such a structural colorant within a paint system because the liquid element (such as water) used to disperse the paint components will fill the air gaps 15 and reduce, if not completely destroy, the efficacy of the structural colorant 10.

Figure 2:
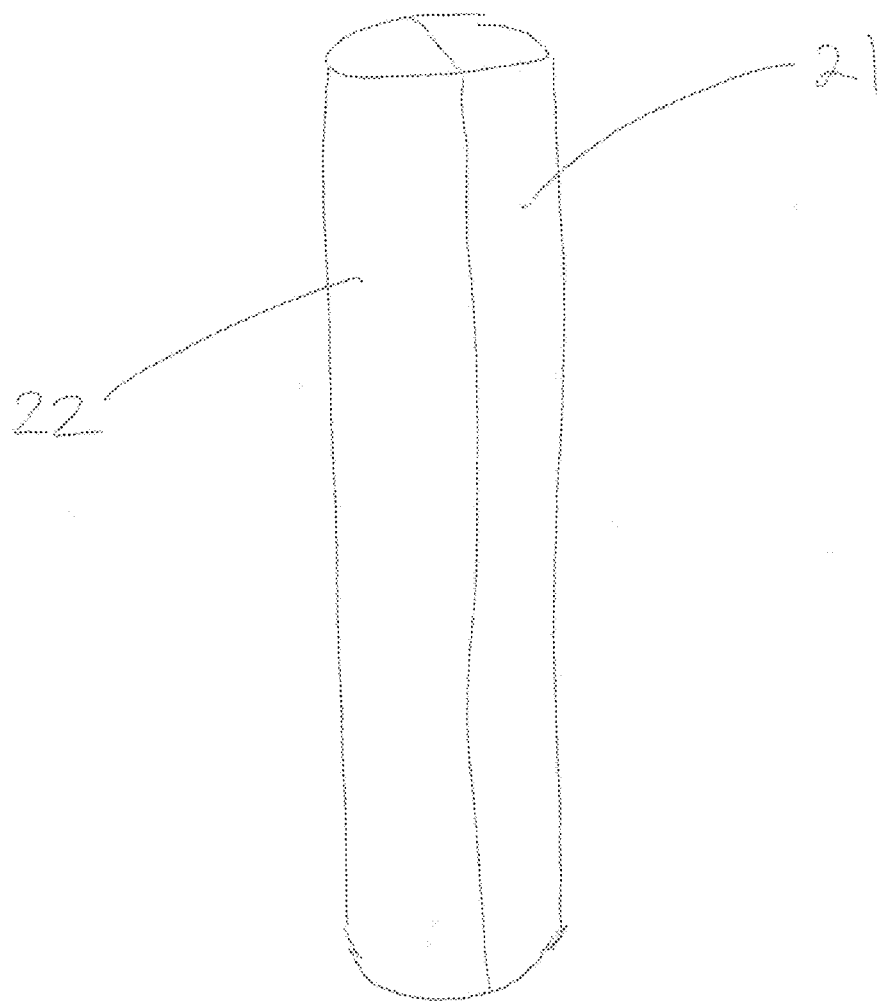
FIG. 2 shows a perspective view of an exemplary structural colorant according to the prior art.

FIG. 2 shows an additional example of another exemplary structural colorant 20 that is made from a first polymer 21 and a second polymer 22 which are co-extruded. This structural colorant 20 may provide color benefits from the first polymer 21 having a particular index of refraction that is different from that of air, and the second polymer 22 having an index of refraction that is approximately that of air. However, even though such a structural colorant 20 would prevent the liquid element of a paint product from penetrating the structural colorant, such a structural colorant 20 will still provide an iridescent effect to the final paint composition because of the relative angle dependence of the observable color.

Figure 3:
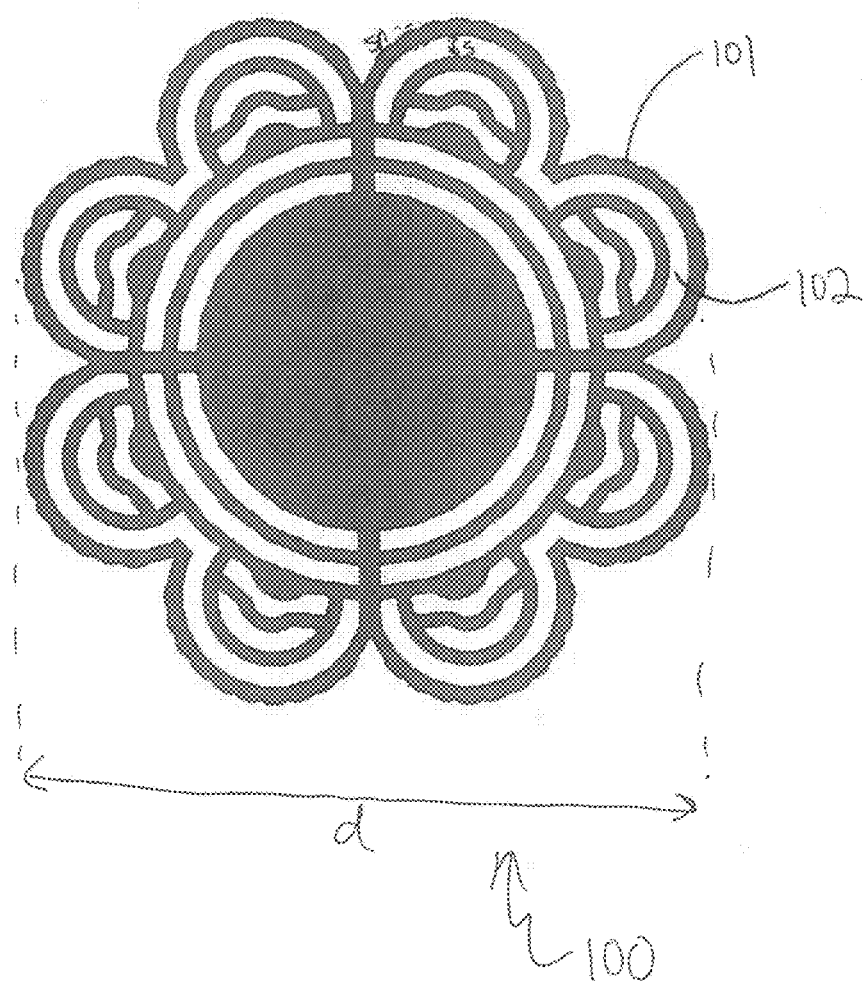
FIG. 3 shows a cross-sectional view of an exemplary structural colorant according to some embodiments described herein.

FIG. 3 shows the cross-sectional view of an exemplary structural colorant 100 according to some embodiments. The exemplary structural colorant 100 of FIG. 3 is formed by a semi-continuous network comprising a first polymer 101 which provides the main structural components for the structural colorant 100. In the exemplary embodiment of FIG. 3, the semi-continuous network is a multilayer structure with hierarchical features, namely, subcylindrical multilayers surrounding a multilayer cylinder and having high rotational symmetry (i.e., the structure looks substantially the same after being rotated by one or more partial turns). In the exemplary structural colorant 100 of FIG. 3, the discontinuities in the first polymer 101, which can be seen as spaces between the layers of the first polymer 101, comprise air, thereby forming an air gap 102. Exemplary polymers which may be used for the first polymer 101 include but are not limited to: poly(pentabromobenzyl methacrylate), poly(pentabromophenyl methacrylate), poly(pentabromobenzyl acrylate), poly(p-xylylene), poly(2,6-dichlorostyrene), poly(2-chlorostyrene), and the like.

Figure 4:
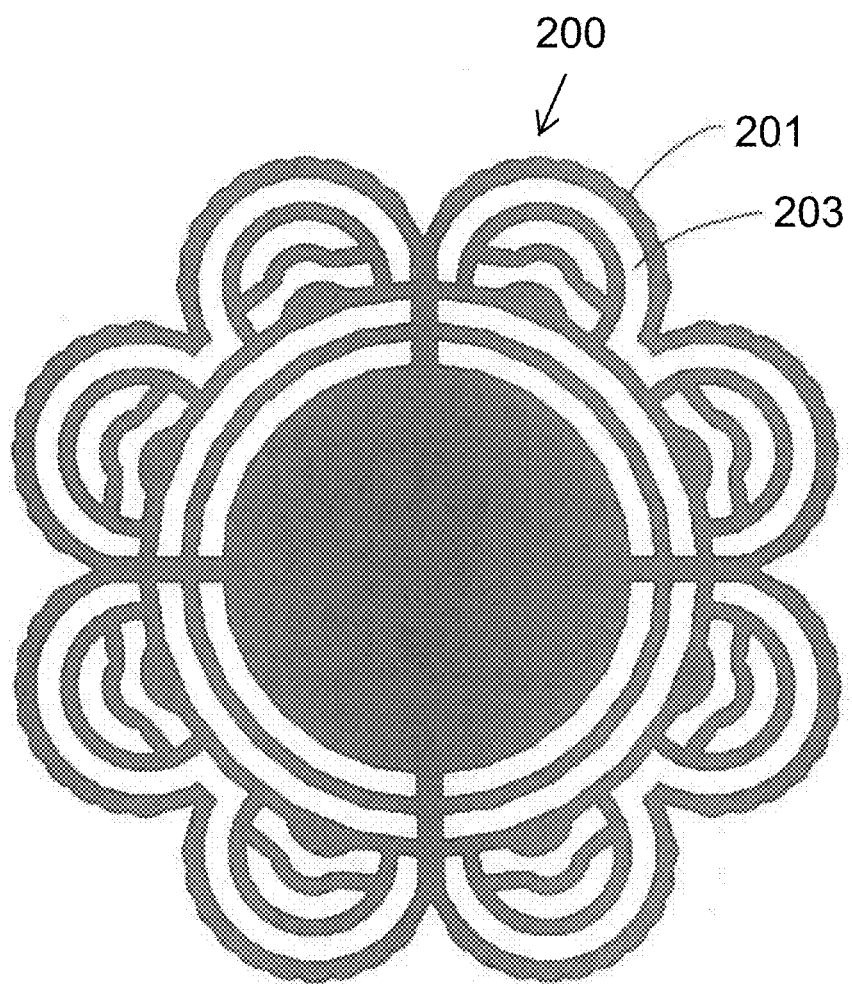
FIG. 4 shows a cross-sectional view of an alternative embodiment of the structural colorant of FIG. 3.

FIG. 4 shows the cross-sectional view of another exemplary embodiment of a structural colorant 200 having the same semi-continuous network, multilayer, hierarchical first polymer 201 structure as the one shown in FIG. 3. However, in the embodiment shown in FIG. 4, the structural colorant 200 further comprises a second polymer 203 interspersed between the layers of the first polymer 201 instead of an air gap akin to the air gap 102 of FIG. 3. Exemplary polymers which may be used for the second polymer 203 include but are not limited to: poly(hexafluoropropylene oxide), poly(pentadecafluorooctyl acrylate), poly(tetrafluoro-3-(heptafluoropropoxy)propyl acrylate), poly(tetrafluoroethylene), poly(nonafluoropentyl acrylate), poly(2,2,3,3,4,4,4-heptafluorobutyl acrylate), and the like.

Figure 5:
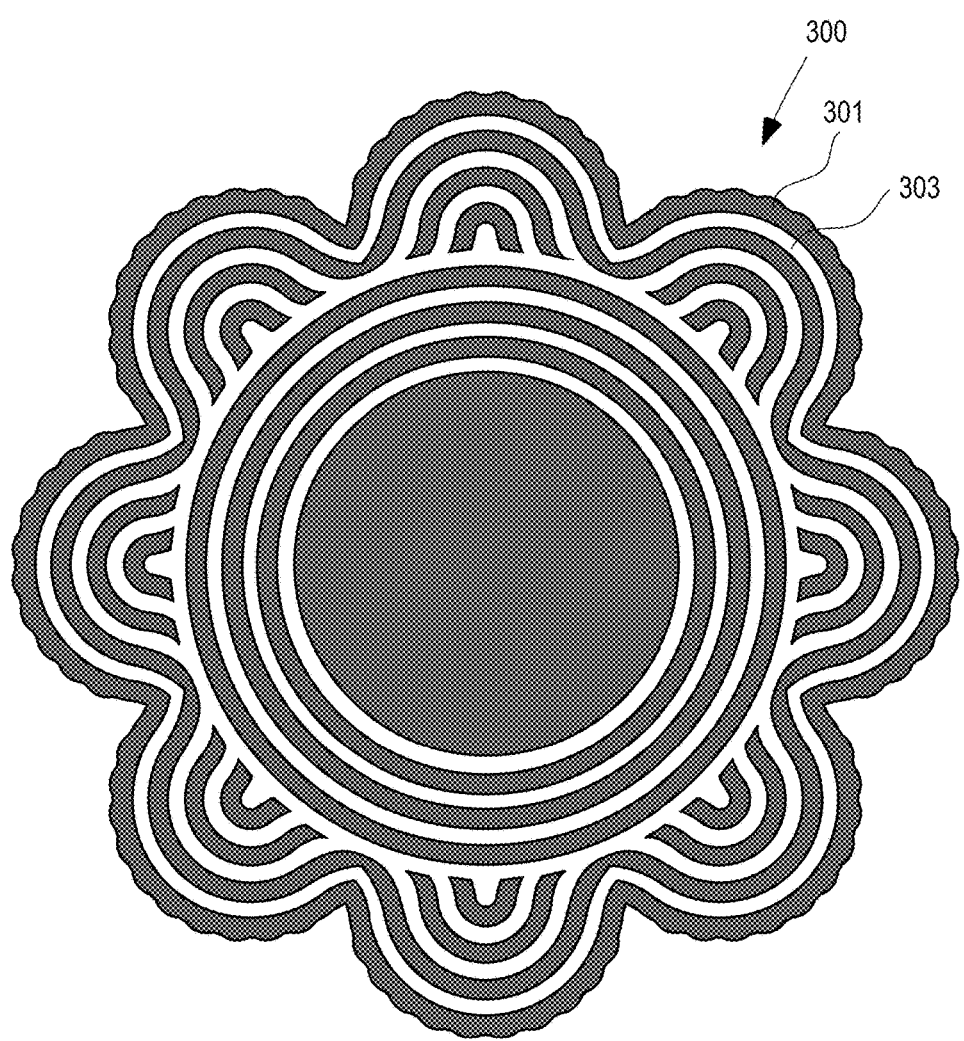
FIG. 5 shows the cross-sectional view of an exemplary embodiment of a structural colorant according to some embodiments described herein.

FIG. 5 shows a cross-sectional view of another exemplary embodiment of a structural colorant 300. The structural colorant 300 of FIG. 5 is formed by providing a discontinuous network of a first polymer 301 which provides the main structural components for a discontinuous second polymer 303. In other non-limiting embodiments, the first and second polymers 301 and 303, respectively, can be formed as continuous multilayer networks, discontinuous multilayer networks, or some combination thereof.

In some nonlimiting embodiments, the first polymer 101, 201, 301 has a refractive index of from about 1.5 to about 1.8. In other nonlimiting embodiments, the first polymer 101, 201, 301 has a refractive index from about 1.55 to about 1.75. In some nonlimiting embodiments, the second polymer 203, 303 has a refractive index of from about 1.2 to about 1.45. In other nonlimiting embodiments, the second polymer 203, 303 has a refractive index from about 1.35 to about 1.45.

In certain nonlimiting embodiments, in a structural colorant 200, 300, the difference in the refractive index between the first polymer 201, 301 and the second polymer 203, 303 is from about 0.1 to about 0.6. In certain other nonlimiting embodiments, the difference in the refractive index between the first polymer 201, 301 and the second polymer 203, 303 is from about 0.1 to about 0.4.

In certain nonlimiting embodiments, the size of a structural colorant 100, 200, 300 is from about 1 micron to about 50 microns in maximum diameter. In certain other nonlimiting embodiments, the size of a structural colorant 100, 200, 300 is from about 4 microns to about 40 microns in diameter. In yet other nonlimiting embodiments still, the size of a structural colorant 100, 200, 300 is from about 10 microns to about 30 microns in diameter. In certain embodiments, the thickness, s, of the layers of the first and second polymers 301, 303 within the structural colorant 300 is from about 50 nm to about 500 nm. In certain other embodiments, the thickness, s, of the layers of the first and second polymers 301, 303 is from about 50 nm to about 200 nm. In certain other embodiments still, the thickness, s, of the layers of the first and second polymers 301, 303 is from about 50 nm to about 100 nm. In one exemplary embodiment, the thickness s of the first polymer 301 is about 300 nm and the thickness s of the second polymer 303 is 450 nm.

In certain embodiments of the present invention, the structural colorant 100, 200, 300 of FIGS. 3, 4, and 5 is a three dimensional, highly symmetrical particle. Because of the high level of symmetry, the particles of the structural colorants 100, 200, 300 do not exhibit iridescence in part because the diffraction and/or reflectance of light is always across the same size spacing regardless of the relative positioning of the particles of the structural colorants 100, 200, 300. In some embodiments the structural colorant described herein have two planes of symmetry, as can be seen, for example, with reference to the exemplary embodiments illustrated in FIGS. 3-5. In some embodiments (including FIGS. 3-5), the structural colorants described herein have at least two planes of symmetry through their center. In some embodiments, the structural colorants described herein have from 2 to about 20 planes of symmetry. In still other embodiments, the structural colorants described herein have from about 4 to about 20 planes of symmetry. In yet other embodiments, the structural colorants described herein have from about 8 to about 20 planes of symmetry.

Example 1: Design of the Structural Colorant

Structural colorants may be designed using finite element analysis or finite differential time domain simulation. Alternatively, the design of a structural colorant may be derived from a structural colorant which is naturally occurring (such as the structural colorant from a bird's feather, insect, etc). One of skill in the art may use electron microscopy (scanning, tunneling, transmission, etc.) or any other known means to analyze the structure of a naturally-occurring structural colorant.

Example 2: Forming a Structural Colorant

A computer aided design (CAD) program (DEScribe, Dimension Engineering, Akron, Ohio) is used to design a surface prototype which suits the description of the exemplary structural colorants as described herein. The surface prototype is exported as .STL files to a mesh fixing, slicing, and hatching software which then translates the files to .GWL files to be then imported to the 3D laser lithography system.

Figure 6:
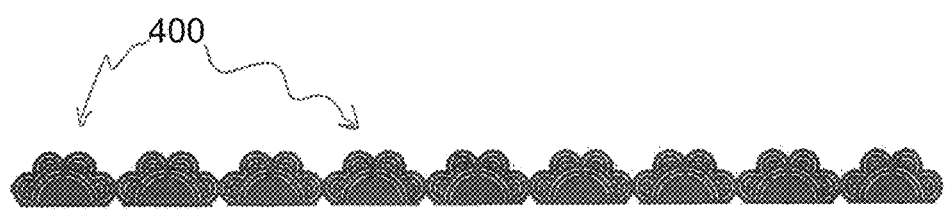
FIG. 6 shows a cross-sectional view of a plurality of half-printed structural colorant particles.
Figure 7:
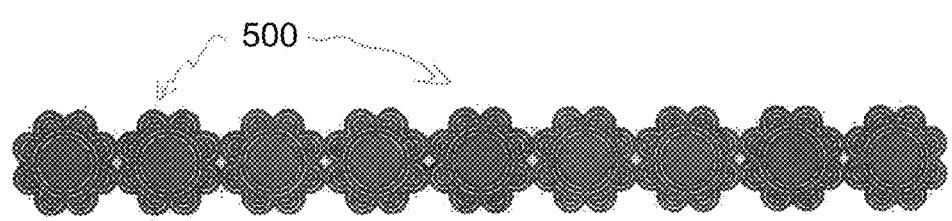
FIG. 7 shows a cross-sectional view of a plurality of fully-printed structural colorant particles.

An exemplary structural colorant according to the present invention is manufactured as follows: A 3-D laser lithography system (Photonic Professional GT) (Nanoscribe GmbH, Photonic Professional) is used to performed a two-photon polymerization. An acrylic-based monomer liquid photoresist optimized for two-photon polymerization (TPP) applications (refractive index (n) 1.52, IP-DIP, Nanoscribe GmbH) is used for 3D printing, with the photoresist being drop-casted on a neutral density filter substrate (NE540B-A, Thorlabs, Inc., Newton, N.J., USA) and the objecting lens immersed directly in the photoresist. A femtosecond laser (center wavelength of 780 nm, pulse width of 100 fs, repetition rate of 80 MHz, and maximum power of 150 mW) is used as the irradiation source. An oil immersion objective lens (63× and 1.4 NA, Carl Zeiss AG, Germany) is used to focus the laser beam. A laser power of 25 mW is used in the TPP process and is controlled by an acousto-optic modulator. The writing speed used in this experiment (50 mm/s) is controlled by a galvo-mirror scanner. After TPP, the samples are removed from the sample holder and developed in propylene glycol monomethyl ether acetate (PGMEA, 484431, Sigma-Aldrich Co., LLC, St. Louis, Mo., USA) for 20 min, followed by a cleaning in isopropyl alcohol (IPA) before drying. Nonlimiting embodiments of the resultant structural colorants are shown in FIGS. 6 and 7. Generally, nine structures of each design can be written simultaneously within a single writing field (150 μm×150 μm). A single writing field of each design can be examined using scanning electron microscopy (Hitachi S04700 SEM, Hitachi High-Technologies Corp., Tokyo, Japan) to confirm that the structural colorants are fabricated according to desired designs. For SEM, the samples were sputtered-coated with 5 nm of chromium and the imaging voltage was low (e.g., less than 10 kV) to avoid damaging the structural colorants.

Example 3: Asymmetrical Structural Colorant

Figure 8:
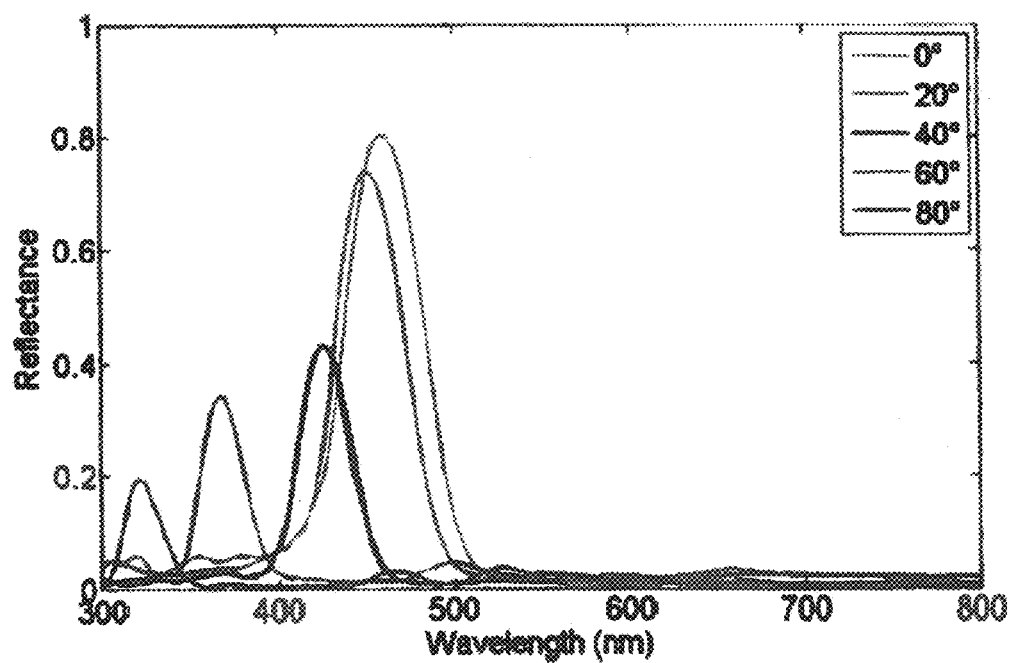
FIG. 8 shows graphical representation of the simulated optical properties of a simulated structural colorant that has only one plane of symmetry.
Figure 10:
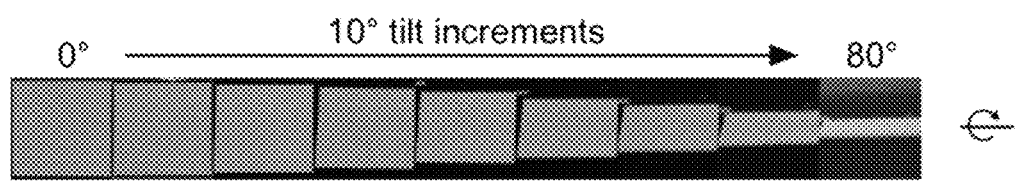
FIG. 10 shows the orientation of an exemplary structural colorant being rotated in 10° increments while being photographed for iridescence analysis.

A finite element analysis simulation of a structural colorant 400 fabricated according to Example 1 is performed, but only half of the structural colorant is simulated. An exemplary representation of the structural colorant 400 is shown in FIG. 6. Simulated results (using finite element analysis) are shown in FIG. 8. The fabricated structural colorants were mounted on a tilting stage, and the tilt angle of the stage was measured by Wixey™ Digital Angle Gauge (WR3000, Type 1, Barry Wixey Development, FL, USA), started in horizontal position (0°) with 10° increments up to 80°. The color at each tilt position was documented by Canon PowerShot SX60 HS digital camera (Canon, Inc., Tokyo, Japan) with Raynox DCR-250 Super Macro Snap-On Lens (Yoshida Industry Co., Ltd., Japan) and Bestlight® 48 LED Macro Ring Light. All photos were taken under the same settings at once without post-editing, except cropping and resizing. An exemplary representation of the rotational positions (i.e., 10° through 80°) at which the color was photographed is depicted in FIG. 10.

The reflectance spectra at each tilt position were measured by AvaSpec-2048 spectrometer with 200 ms integration time, averaging 10 scans (Avantes Inc., Broomfield, Colo., USA) using Bestlight® 48 LED Macro Ring Light as illumination. All measurements were taken relative to Avantes WS-2 reference tile (a white diffuse PTFE based material, 100%) and a black velvet cloth (0%). The spectra were then smoothed and plotted using GraphPad Prism statistical software (GraphPad Software, Inc., La Jolla, Calif., USA). The colours of spectral curves and tiles in the plot were estimated colours based on smoothed, normalized spectra using "spec2rgb" function in R script "pavo" (described in Maia, R., Eliason, C. M., Bitton, P.-P., Doucet, S. M. & Shawkey, M. D. pavo: an R package for the analysis, visualization and organization of spectral data. *Methods Ecol Evol* 4, 906-913 (2013)). As can be seen in FIG. 8, even with the bumpy surface of the structural colorant 400, the structure is iridescent due to the lack of rotational symmetry. FIG. 8 also shows that the peak position (hue) changes based on the viewing angle (i.e., showing that there is iridescence).

Example 4: Symmetrical Structural Colorant

Figure 9:
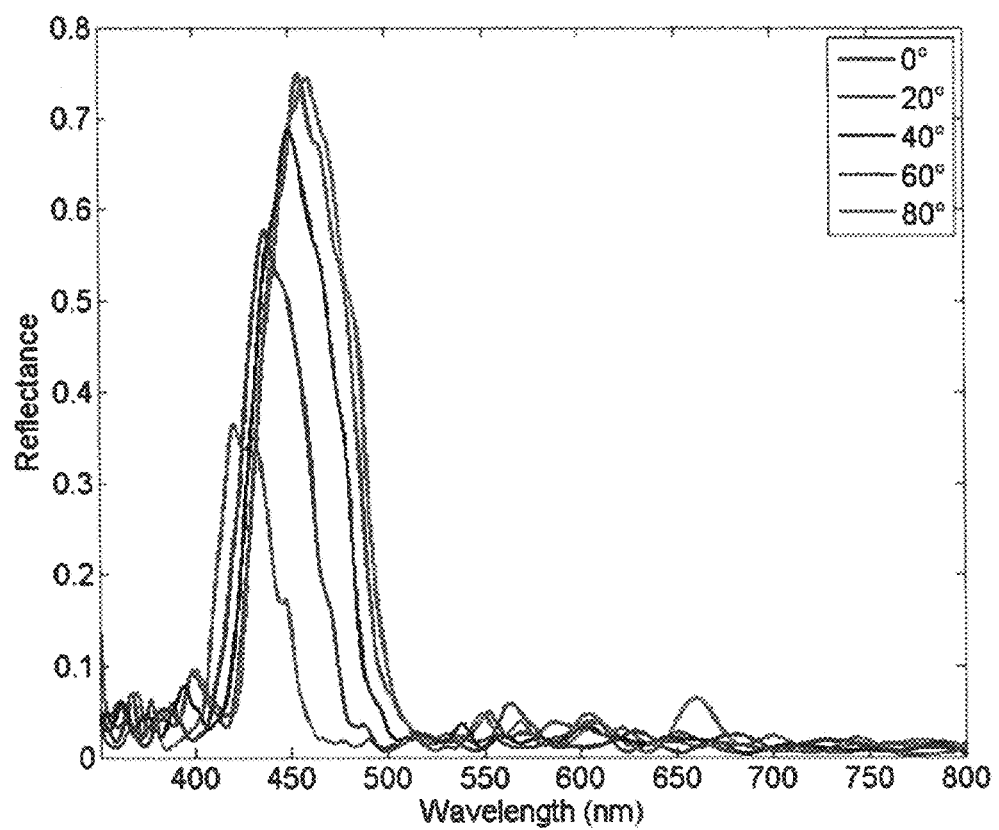
FIG. 9 shows graphical representation of the simulated optical properties of a simulated structural colorant that has only two or more planes of symmetry.
Figure 11:
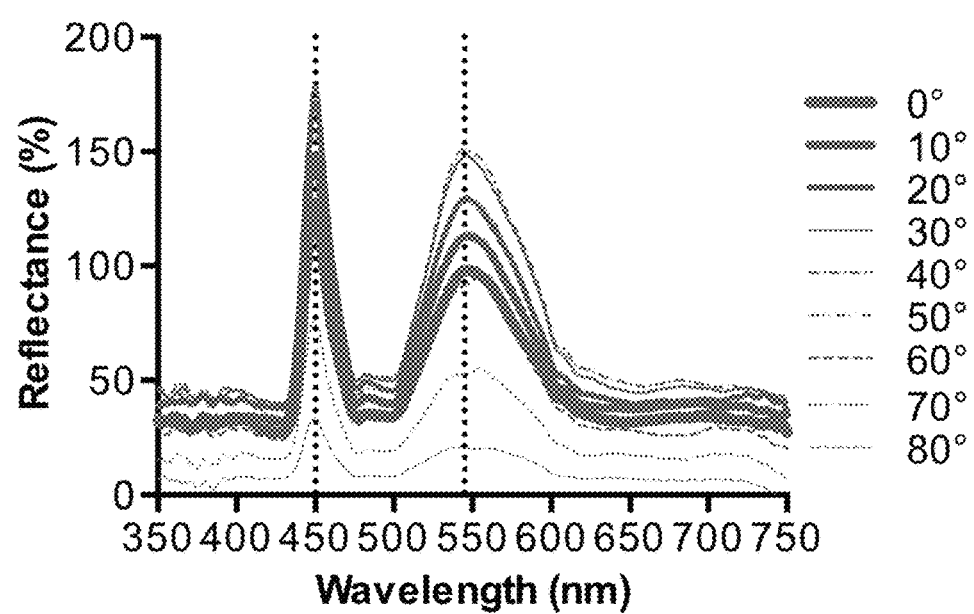
FIG. 11 shows reflectance spectra of an exemplary structural colorant measured at each position (i.e., 10° through 80°).

A finite element analysis simulation of a structural colorant 500 fabricated according to Example 1 is performed and the whole structural colorant is simulated. A representation of the structural colorant 500 is shown in FIG. 7. Simulated results (using finite element analysis) are shown in FIG. 9, while the reflectance spectra of the structural colorant 500 measured at each position (i.e., 10° through 80°) is depicted in FIG. 11. FIG. 9 shows that the peak position is substantially unchanged with different viewing angles and FIG. 11 shows that both peak positions and peak ratios remain consistent with different viewing angles, thus indicating non-iridescence of the structural colorant 500.

Unless otherwise specified, all measurements herein are made at 23±1° C. and 50% relative humidity.

All publications, patent applications, and issued patents mentioned herein are hereby incorporated in their entirety by reference. Citation of any reference is not an admission regarding any determination as to its availability as prior art to the claimed invention.

The dimensions and values disclosed herein are not to be understood as being strictly limited to the exact numerical values recited. Instead, unless otherwise specified, such a dimension is intended to mean both the recited value and a functionally equivalent range surrounding that value. For example, a dimension disclosed as "40 mm" is intended to mean "about 40 mm".

The methods and structural colorants described herein provide for production of non-iridescent structural colorants with customizable hues, which may be advantageously used in various applications instead of synthetic pigments and dyes. While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

I claim:

1. A substantially iridescence-free structural colorant comprising:
    a semi-continuous structure formed by multiple layers of a first synthetic polymer and air gaps interspersed between the layers of the first polymer, the semi-continuous structure having a center and at least two planes of symmetry through the center.

2. The structural colorant of claim 1, wherein the semi-continuous structure includes a multi-layer inner cylinder and a plurality of multi-layer partial cylinders surrounding the inner cylinder.

3. The structural colorant of claim 1, wherein the partial cylinders are semi-cylinders.

4. The structural colorant of claim 1, wherein the first polymer is selected from the group consisting of: poly(pentabromobenzyl methacrylate), poly(pentabromophenyl methacrylate), poly(pentabromobenzyl acrylate), poly(p-xylylene), poly(2,6-dichlorostyrene), and poly(2-chlorostyrene).

5. The structural colorant of claim 1, wherein the first polymer has a refractive index from about 1.5 to about 1.8.

6. The structural colorant of claim 1, wherein the structural colorant has a maximum diameter from about 1 micron to about 50 microns.

7. The structural colorant of claim 1, wherein each of the layers of the first polymer has a thickness from about 50 nm to about 500 nm, and wherein each of the air gaps has a thickness from about 50 nm to about 500 nm.

8. A substantially iridescence-free structural colorant comprising:
    a semi-continuous structure formed by multiple layers of a first synthetic polymer and multiple layers of a second polymer interspersed between the layers of the first polymer, the semi-continuous structure having a center and at least two planes of symmetry through the center.

9. The structural colorant of claim 8, wherein the semi-continuous structure includes a multi-layer inner cylinder and a plurality of multi-layer partial cylinders surrounding the inner cylinder.

10. The structural colorant of claim 8, wherein the partial cylinders are semi-cylinders.

11. The structural colorant of claim 8, wherein the first polymer is selected from the group consisting of: poly(pentabromobenzyl methacrylate), poly(pentabromophenyl methacrylate), poly(pentabromobenzyl acrylate), poly(p-xylylene), poly(2,6-dichlorostyrene), and poly(2-chlorostyrene).

12. The structural colorant of claim 8, wherein the second polymer is selected from the group consisting of: poly(hexafluoropropylene oxide), poly(pentadecafluorooctyl acrylate), poly(tetrafluoro-3-(heptafluoropropoxy)propyl acrylate), poly(tetrafluoroethylene), poly(nonafluoropentyl acrylate), and poly(2,2,3,3,4,4,4-heptafluorobutyl acrylate).

13. The structural colorant of claim 8, wherein the first polymer has a refractive index from about 1.5 to about 1.8, and wherein the second polymer has a refractive index from about 1.2 to about 1.45.

14. The structural colorant of claim 13, wherein a difference between the refractive index of the first polymer and the refractive index of the second polymer is from about 0.1 to about 0.6.

* * * * *